United States Patent [19]

Antonenko

[11] Patent Number: 4,627,914

[45] Date of Patent: Dec. 9, 1986

[54] DEVICE FOR AUTOMATIC CONTROL OF PRESSURE FILTERS

[76] Inventor: Viktor I. Antonenko, Narimanova, 6, kv. 140, Kharkov, ploschad, U.S.S.R.

[21] Appl. No.: 830,526

[22] PCT Filed: Jun. 21, 1985

[86] PCT No.: PCT/SU85/00050

§ 371 Date: Feb. 7, 1986

§ 102(e) Date: Feb. 7, 1986

[87] PCT Pub. No.: WO86/00240

PCT Pub. Date: Jan. 16, 1986

[30] Foreign Application Priority Data

Jun. 21, 1984 [SU] U.S.S.R. ............... 3759875

[51] Int. Cl.⁴ ............................ B01D 25/12
[52] U.S. Cl. ................... 210/96.1; 210/108; 210/138
[58] Field of Search ........... 210/96.1, 108, 138

[56] References Cited

U.S. PATENT DOCUMENTS

| 4,151,080 | 4/1979 | Zuckerman | 210/96.1 |
| 4,439,325 | 3/1984 | Blais | 210/138 |
| 4,544,489 | 10/1985 | Campbell et al. | 210/96.1 |

FOREIGN PATENT DOCUMENTS

| 2059276 | 4/1981 | United Kingdom . |
| 2110553 | 6/1983 | United Kingdom . |
| 442812 | 9/1974 | U.S.S.R. . |
| 680749 | 9/1979 | U.S.S.R. . |
| 683784 | 9/1979 | U.S.S.R. . |
| 841650 | 6/1981 | U.S.S.R. . |

OTHER PUBLICATIONS

"Radio", No. 1, 1977, pp. 43–44.
"V Pomoshch Radioliubiteliu", ISSN 0130-0830, Issue 72, pp. 62–64, 69–73.
"V Pomoshch Radioliubiteliu", ISSN 0130-0830, Issue 77, pp. 47–51.
"V Pomoshch Radioliubiteliu", ISSN 0130-0830, Issue 76, pp. 52–54.

*Primary Examiner*—John Adee
*Attorney, Agent, or Firm*—Lilling & Greenspan

[57] ABSTRACT

A device for automatic control of pressure filters comprises a control assembly connected by a filtrate pipe (2) to at least one pressure filter (1), which is essentially a vertically arranged pipe (4) communicated with the filtrate pipe (2) and limited, at the lower end thereof, by a baffle (7) having a calibrated opening (7') and provided with a sensor (3) which is an electro-capacitive element connected via a converter (14) and a switch (15) to a timer unit (8) coupled to a frequency coincidence unit (17) which is connected to a frequency generator (19), and to control units (9) and to the pressure filter control consoles (11). The control unit (9) and the control console (11) of each pressure filter (1) are joined together, while the control output of each control console (11) is connected to an actuating device of a respective pressure filter (1).

2 Claims, 3 Drawing Figures

DEVICE FOR AUTOMATIC CONTROL OF PRESSURE FILTERS

TECHNICAL FIELD

This invention relates to control of suspension filtration processes and, in particular, to devices for automatic control of pressure filters.

BACKGROUND ART

Known in the art is a method of automatic control of a chamber filter press (cf., for example, the USSR Inventor's Certificate No. 442 812, Class B 01 D 37/04, J 05 D 27/00, published in 1974). The automatic controlling device realizing the known method is provided with a unit for determination of the termination of the suspension dehydration process when the filter cake reaches a specific water content which is continuously monitored by means of a sensor extending through the rubber membrane and located inside a top control chamber of the horizontal chamber filter press. This sensor is connected to an amplifying device connected to an actuating device of the filter press. The amplifying device is equipped with a sensor in order to set a specific water content level of the filter cake and is provided with a scale for visual control. Continuous monitoring of the water content level of the filter cake, which is the function of the electrical conductivity of the liquid phase in the filter cake, is effected by means of the sensor located in the chamber of the filter press and the amplifying device. The water content of the filter cake is shown on the scale of the amplifier sensor, calibrated to read the percentage ratio of the liquid and solid phases.

When a specific water content of the filter cake is obtained, the amplifier sensor generates a signal to indicate termination of the filtering process, which is delivered, after amplification, to the actuating device of the filter press.

A gland seal in the membrane is to be provided to install the sensor in the filter press chamber. If the membrane is made movable along the sensor, the chamber cannot be hermetically sealed.

The known device is deficient in that the sensor is installed in the upper chamber on the filter press whose chambers are arranged horizontally. The water content of the cake in the upper chamber can substantially differ from that of other chambers and cannot, therefore, be accurately controlled. Moreover, the conductivity of the liquid phase of the filter cake varies with the amount of coagulating agents and soluble salts used, also affecting the accuracy of the water content determination.

To summarize, the known device cannot be used for accurate determination of the average water content of the filter cake in all chambers of the filter press. It is certainly not applicable to filter presses having a vertical arrangement of chambers.

Also known in the art is a device for automatic control of the cake water content in a horizontal chamber filter press (cf., for example, the USSR Inventor's Certificate No. 683 784, Cl. B 01 D 37/04, B 01 D 25/12, published in 1979), which comprises a unit for monitoring the water content of the filter cake in the chambers of the filter press, a measuring vessel for filtrate collection, a pipe connecting one of the chambers to the measuring vessel, a filtrate level detector comprising an electrode vertically movable by a hand drive, a scale calibrated in percent of the initial water content, and a locking valve equipped with an electromagnetic drive, and an amplifying-converting unit. The amplifier-converter comprises a step-down transformer, a resistor, a rectifier built around diodes, a semiconductor amplifier, and sound and light indicators.

For effective use of the known device, the content of the solid phase in the suspension has to be determined. It is done in a laboratory and the process takes more time than the actual dehydration of the suspension. Moreover, the water content of the cake is monitored in one chamber only, where it can substantially differ from the average water content of the cake in other chambers of the filter press. The efficiency of the filter press is therefore seriously affected.

Also known in the art is a method for controlling a chamber filter press (cf., for example, the USSR Inventor's Certificate No. 841 650, Cl. B 01 D 37/04, published in 1981) which can be used to control the water content of the filter cake by way of the feed rate and density of the suspension delivered to the filter press. The device realizing the known method comprises a delivery pipeline on which a suspension density transmitter is mounted together with a flowmeter and an actuating device (valve). The device also comprises a comparison unit, a multiplier, an averaging unit, an integrator, a functional unit, an indication unit, and a computing unit.

The output of the suspension density transmitter is connected to one of the inputs of the multiplication unit and an input of the functional unit via the averaging unit. The output of the flowmeter is connected to a second input of the multiplication unit via the integrating unit. The output of the functional unit is connected to a first input of the computing unit, while the output of the multiplication unit is connected to a second input of the computing unit. The first input of the comparison unit is connected to the output of the transmitter, while the second input of the comparison unit is connected to the output of the computing unit. The output of the comparison unit is connected to an input of the indicating device and to the input of the actuating device.

The known device is deficient in that the flow rate of the suspension and its density cannot be determined when the content of the solid phase is too high. The termination of the suspension dehydration process is therefore impossible to control with acceptable accuracy.

Also known in the art is a method for automatic control of pressure filters (cf., for example, the USSR Inventor's Certificate No. 680 749, Cl. B 01 D 37/04, published in 1979). The device realizing this method comprises a unit for determination of the suspension dehydration process length, which is connected to at least one filter press and is equipped with sensor capable of determining, in the process of dehydration, the moment the solid phase reaches specific parameters. The unit also comprises a timer indicating the length of the suspension dehydration process, which is connected (electrically) to the sensor, a control console of pressure filters, whose control outputs are connected to actuating devices of the pressure filters, while the inputs thereof are conencted to an output of a computer memory unit connected to a computer and to the timer.

The control unit is a standard cell through which a specific amount of suspension and filtrate passes within a specific time. The timer supplies the duration of the period in which the specific amount of filtrate passes through the standard cell. This time is fed to the computer and converted to filtration constants which are entered to the computer memory. The operator then uses conversion tables to find, on the basis of the filtration constants, the length of the dehydration process and enters this information to the control consoles of the pressure filters.

This device realizing the known method is deficient in that it relies on the conversion tables to find the length of the suspension dehydration process, the procedure being unreliable and inaccurate.

Disclosure of the Invention

The invention is to provide a device for automatic control of pressure filters, whose design and circuitry ensure accurate determination of the time required for the suspension dehydration process to be completed so that cakes having specific water content can be obtained with varying filter-ability of the suspension and varying content of the solid phase therein, this time to be used to control the operation of the pressure filters.

The invention consists in that a device for automatic control of pressure filters used to dehydrate suspensions, comprising a control assembly connected to at least one filter press, which is to determine the duration of the suspension dehydration process and is equipped with a sensor to determine, in the process of dehydration, the moment when the solid phase reaches specific parameters, a timer to count the length of the dehydration process, which is electrically connected to the sensor, control consoles whose number is equal to the number of press filters, the first input of each control console being electrically connected to an output of the timer, while a control output of each control console is connected to an actuating device of a respective filter press, according to the invention, also comprises a frequency generator whose control input is united with a first control input of the timer and connected to first outputs of the control consoles, a second control input of the timer is connected to second outputs of the control consoles, control units whose number is equal to the number of filter presses, the first input of each control unit is connected to the output of the timer, an output of each control unit is connected to the input of a respective control console, the control assembly is connected to at least one filter press by means of a filtrate pipe, the control assembly being essentially a vertically arranged pipe whose cross-section is equal to or larger than the cross-section of the filtrate pipe and whose upper end communicates with the initial portion of the filtrate pipe, while the lower end thereof is closed by a baffle featuring a calibrated opening through which said pipe communicates with the final portion of the filtrate carrying pipe, the sensor is an electrocapacitance-type element positioned inside the pipe throughout its length so that the axis of the electrocapacitance-type element is displaced in relation to the axis of the calibrated opening, the sensor is electrically connected to the timer via a capacitance-to-frequency converter coupled in series with a sensor switch and a frequency coincidence unit connected to an output of the frequency generator and via suspension dewatering termination switches whose number is equal to that of the filter presses and which are connected to the input of each control console, which is united with the input of the timer, third, fourth and fifth outputs of each control console are connected, respectively, to the second, third and fourth inputs of respective control units, the sensor switch and the suspension dewatering termination switch of a fiter press are joined with a switch of the control console of this filter press.

The control unit of each filter press can comprise a first coincidence circuit whose first input should be connected to an output of the timer, a second input should be connected to an output of the control console, a flip-flop whose input should be connected to an output of the matching circuit, an electrical signal generator whose output should be connected to an input of the flip-flop and the input thereof to the output of the control console, a second matching circuit whose input should be connected to an output of the electrical signal generator, while the output thereof should be connected to the input of the control console, a frequency divider whose output should be connected to the input of the second matching circuit, while the input thereof should be joined with the input of the electrical signal generator, an AND gate, a generator whose output should be connected to an input of the AND gate and to an input of the frequency divider, while the input thereof should be connected to the output of the control console, the input of the AND gate being connected to the output of the flip-flop, while the output thereof is connected to the inputs of the matching circuits.

The invention permits dewatering of suspension by means of pressure filters and obtaining a specific final water content irrespective of the filtering properties of the suspension and the content of the solid phase therein. It also permits automatic determination of the duration of the dewatering process with due allowance for varying filtering parameters and control of a group of pressure filters on the basis of the time determined by means of the control pressure filter during the suspension dewatering.

The design and circuitry of the device for automatic control of pressure filters are such that no monitoring of the suspension filtering properties, the solid phase content and water content of the filter cake is necessary.

Since the filter cake has a desired and constant water content, no additional treatment of the cake is required to remove the excess water therefrom. The device according to the invention permits obtaining better quality of filter cakes and make the servicing less labour-intensive.

BRIEF DESCRIPTION OF ACCOMPANYING DRAWINGS

The invention will now be described in greater detail with reference to a specific embodiment thereof and the accompanying drawings, wherein.

BEST MODE FOR CARRYING OUT THE INVENTION

A device for automatic control of pressure filters comprises a control assembly connected to at least one pressure filter 1 (FIG. 1), which is a reference or monitoring pressure filter, by means of a filtrate pipe 2. The control assembly is intended to determine the duration of the suspension dewatering process and is equipped with a sensor 3 which determines, in the course of the dewatering process, the moment when the solid phase of the suspension reaches desired parameters.

Control assemblies can be installed on several pressure filters so that the operation of the filters is not interrupted when the monitored pressure filter is stopped for repair and a ready substitute is available.

Figure 1:
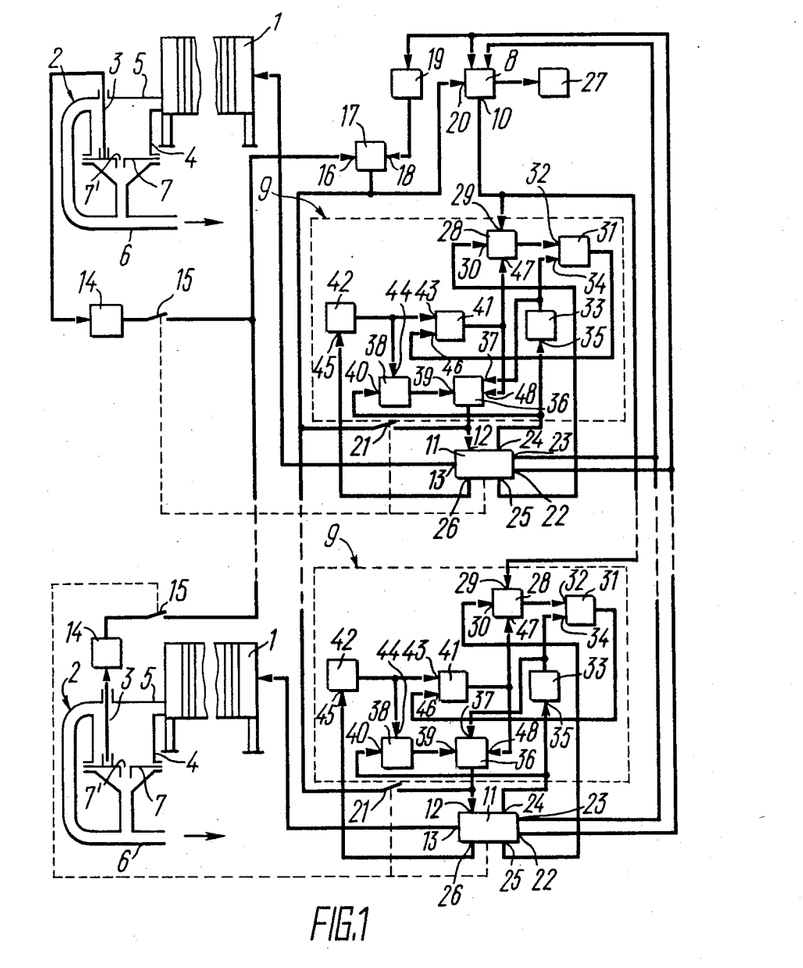
FIG. 1 shows a block diagram of a device for automatic control of pressure filters, according to the invention.

A control assembly is essentially a vertically arranged pipe 4 whose cross-section is equal to or larger than that of the filtrate pipe 2. The upper end of the pipe 4 communicates with an initial portion 5 of the filtrate pipe 2, while the lower end thereof is limited by a baffle 7 having a calibrated opening 7' through which the pipe 4 communicates with a final portion 6 of the filtrate pipe 6. The sensor 3 is a capacitance-type element and is located inside the pipe 4 throughout its length so that the axis of the capacitance-type element is displaced in relation to the axis of the calibrated opening 7'. The sensor 3 permits monitoring of the water content of the filter cake in all chambers of the pressure filter simultaneously, since the filtrate is supplied from all chambers to the pipe 2 and passes through the sensor 3. The conductivity of the liquid phase of the suspension has no effect on the capacitance of the sensor. The monitoring helps to determine an average water content of the cake during the dewatering process irrespective of the irregular thickness of the cake in the chambers of the pressure filter 1. In addition, when the water content of the cake in the chambers of the pressure filter 1 is monitored by means of the sensor 3 disposed in the pipe 4, there is no need to determine the density and flow rate of the suspension.

The device according to the invention comprises a timing unit 8 which measures the duration of the suspension dewatering process. The timer 8 is built around a known circuit (cf., for example, V Pomosch Radioliubiteliu, collection of articles in Russian, issue 77, Moscow, DOSAAF Publ., 1982, pp. 47-49, E. Zeldin, Frequency Dividers Built around Microcircuits; or issue 72, ibid., 1981, R. Maizuls, Electronic Watch Built around Micropower Integrated Circuits, pp. 60-62, 63 and 64). The device also comprises control units 9 whose number is equal to the number of the pressure filters 1, first inputs of each filter 1 being connected to an output 10 of the timer 8, a control consoles 11 whose number is also equal to that of the pressure filters 1. Inputs 12 of the control consoles 11 are connected to outputs of respective control units 9, while control outputs 13 of the control consoles 11 are connected to actuating devices (not shown) of the pressure filters 1.

The sensor 3 is connected to an input of a capacitance-to-frequency converter 14 whose output is connected, via a sensor engagement switch 15, to an input 16 of a frequency coincidence unit 17 build around a known circuit (cf., for example, V Pomosch Radioliubiteliu, collection of articles, issue 72, Moscow, DOSAAF Publ., 1981, R. Tomas, Digital Synchronizer for Film Sound System, pp. 68, 69-73). An input 18 of the coincidence unit 17 is connected to a frequency generator 19 using a known circuit (cf., for example, ibid., issue 76, 1982, S. Mindelevich, Pulse Generators on Digital Microcircuits, pp. 52-54), while the output thereof is connected to an input 20 of the timer unit 8 and, via switches 21, to the inputs 12 of the control consoles 11. The switches 15 and 21 of a respective pressure filter 1 are mechanically joined with a switch (not shown) of the control console 11 of the same pressure filter 1.

A control input of the frequency generator 19 is joined with a first control input of the timer unit 8 and connected to outputs 22 of the control consoles 11. A second control input of the timer unit 8 is connected to outputs 23 of the control consoles 11. Outputs 24, 25 and 26 of the control consoles 11 are connected, respectively, to second, third and fourth inputs of respective control units 9, a second output of the timer unit 8 being connected to an indication unit 27.

Each control unit 9 comprises a coincidence circuit 28 which is analogous to the coincidence unit 17. Inputs 29 and 30 of the coincidence circuit 28 are connected to the output 10 of the timer unit 8 and to the output 25 of the control console 11. Each control unit 9 also comprises a flip-flop 31 whose input 32 is connected to an output of the coincidence circuit 28, an electrical signal generator 33 using a known circuit (cf., for example, Radio magazine, No. 1, 1977, DOSAAF Publ., Moscow, V. Milchenko, Pulse-Type Units Using Logic Elements, in Russian, pp. 43-44), whose output is connected to an input 34 of the flip-flop 31, while an input 35 is connected to the output 24 of the control console 11.

The control unit 9 also comprises a coincidence circuit 36 which is analogous to the unit 17, whose input 37 is connected to an output of the electrical signal generator 33, while the output thereof is connected to the input 12 of the control console 11, a frequency divider 38 (cf., for example, collection of articles, V Pomosch Radioliubiteliu, issue 77, 1982, Moscow, DOSAAF Publ., E. Zeldin, Frequency Dividers Built around Microcircuits, in Russian, pp. 47-51) whose output is connected to an input 39 of the coincidence circuit 36. An input 40 of the frequency divider 38 is joined with the input 35 of the generator 33.

The control unit 9 also comprises an AND gate 41, a pulse generator 42 which is analogous to the generator 19 and whose output is connected to an input 43 of the AND gate 41 and to an input 44 of the frequency divider 38. An input 45 of the generator 42 is connected to the output 26 of the control console 11, an input 46 of the AND gate 41 is connected to the output of the flip-flop 31, while the output thereof is connected to inputs 47 and 48 of the circuits 28 and 36 respectively.

The capacitance-to-frequency converter 14 comprises an operational amplifier 49 (FIG. 2) whose first input is connected, via a resistor 50, to the output thereof connected, via a resistor 51, to the first input of an operational amplifier 52 and to the sensor 3. The output of the operational amplifier 52 is directly coupled to the second input thereof and to a screen connecting the first input of the operational amplifier 52 and the sensor 3, and, via a resistor 53, to a second input of the operational amplifier 49 through which a resistor 54 is coupled to a common bus. The output of the operational amplifier 52 is connected, via a resistor 55, to a first input of an operational amplifier 56, a second input thereof being connected to the common bus, while the output is connected to the switch 15 and, via a resistor 57, to its first input, and, in addition, via a resistor 58, to the first input of the operational amplifier 49.

The control console 11 comprises coils of relays 59 (FIG. 3), 60, 61 and 62. Some leads of these relays are coupled to a zero bus. A second lead of the relay 59 is the input 12 of the console 11, a second lead of the coil of the relay 60 is connected, via make contacts 61" and 59', to the power supply bus. A second lead of the coil of the relay 61 is connected to the power supply bus via a break contact 63 of a suspension supply valve (not shown) and a make contact 64 of a suspension pressure gauge (not shown). A second lead of the coil of the relay 62 is connected to the power supply bus via a switch 65. The switch 65 is mechanically connected with the switches 15 and 21. The power supply bus is coupled via a make contact 66 of a relay coil (not shown) to an actuating device of the pressure filter 1 (FIG. 1).

A dc terminal 67 (FIG. 3) is connected, via make contacts 62' and 61', to the integrated control inputs of the units 8 (FIG. 1) and 19 and, via a make contact 68 (FIG. 3) of a relay (whose coil is not shown), to the second control input of the timer unit 8 (FIG. 1).

The same terminal 62' (FIG. 3) is connected via a transfer contact 62' and the make contact 68, to the inputs 35 (FIG. 1) and 40 of the generator 33 and the frequency divider 38 respectively.

The same terminal 67 (FIG. 3) is connected, via the transfer contact 62' and the make contacts 61' and 68 coupled parallelly, to the input 45 (FIG. 1) of the unit 42.

The terminal 67 (FIG. 3) is connected, via the transfer contact 62', the make contact 68, and the series-connected break contacts $61_1'$ and $61_1'$, to the input 30 (FIG. 1) of the circuit 28. The coil $61_I$ belongs to the control consoles 11 and is not shown.

The device according to the invention is capable of automatic determination of the duration of the suspension dewatering process in the monitored pressure filter 1 and thus provide a means to control a group of pressure filters engaged in dewatering the same suspension, using the data of the monitored pressure filter on the deatering process duration as a guide.

The proposed device is advantageous in that it eliminates the operations of determining the volume of the filtrate and suspension, the content of the solid phase in the suspension, and the water content of the cake. This is achieved by making use of the kinetics of the flltrate flow from the pressure filter 1. The filtrate flow kinetics remains unchanged with a specific cake thickness and water content. The time varies depending on the solid phase content in the suspension and its fitrability. This time is determined from the moment the filtrate starts flowing in the pipe 2. The device ensures the desired kinetics and thus the maximum productivity of the pressure filter 1, the output cake having a constant specific water content.

The group of pressure filters can be controlled automatically using one of the filters as a pilot unit. The control units 9 and control consoles 11 can control filters automatically without an operator.

The stack of frames (not shown) of the pilot pressure filter 1 is compressed so that the chambers are leakproof. Each chamber is provided with a filtration plate (not shown). The suspension is pumped into chambers under pressure and is separated by the filtering plate into liquid and solid phases. The liquid phase (filtrate) is removed from the chambers of the pressure filter 1 through the pipe 2, while the solid phase is retained by the filtering plate and accumulated in the chambers of the filter press 1.

The duration of the dewatering process is controlled using the flow rate of the filtrate passing through the filtering plate. The desired parameters of the dewatered cake have a corresponding flow rate of the filtrate passing through the filtering plate, which means the dewatering process has come to an end. A calibrated opening 7' in the baffle 7 having a specific size is selected to provide a specific flow rate.

Initially, during the dewatering process the filtrate passes through the filtering plate at a higher rate than the preselected value. All filtrate cannot pass through the opening 7' in the baffle 7. The excess filtrate passes through the pipe 2 in a continuous flow.

The capacitance of the sensor 3 remains unchanged and the converter 14 generates pulses of constant frequency to be supplied to the frequency coincidence unit 17. When the filtrate flow through the pipe 2 is uninterrupted, the output frequencies of the converter 14 and the generator 9 are different, and the output of the unit 17 is zero.

The start of the suspension dewatering process coincides with the moment the timer unit 8 is switched on to count the duration of the deatering operation.

As soon as the flow rate at which the filtrate passes through the filtering plate becomes equal to the predetermined rate or, when the flow rate at which the filtrate passes through the opening 7' in the baffle 7 exceeds the flow rate at which the filtrate exists from the filter press 1, the flow of the filtrate in the pipe 2 is interrupted. The electrical capacitance of the sensor 3 changes and, consequently, the pulse recurrence rate at the output of the converter 14 also changes. The generator 19 is adjusted so that the frequency of its output pulses is equal to the frequency of the output pulses of the converter 14, when a capacitance-type signal arrives to the input of the converter 14 at the moment the flow of the filtrate is interrupted. The capacitance of the sensor 3 changes and, consequently, so does the output pulse recurrence rate of the converter 14. The generator 19 is adjusted so that the frequency of its output pulses is equal to the frequency of the output pulses of the converter 14 when a capacitance type signal arrives to the input of the converter 14 indicating the filtrate flow is interrupted. When pulses having the same frequencies are supplied from the outputs of the generator 19 and the converter 14 to the inputs of the unit 17, the latter produces a signal fed to the unit 8 and to the control console 11. This signal makes the timer unit 8 stop counting the duration of the suspension dewatering process, and the control console 11 produces a command to terminate the suspension dewatering process. After the suspension dewatering process is stopped, the information on the duration of this process is supplied from the unit 8 to the control units 9 of all other pressure filters 1 which are operated on the basis of the duration of the dewatering process of the pressure filter 1.

If the parameters of the suspension fed to the pressure filter 1 during the dewatering process change, the duration of the process also changes and the relevant information is supplied to the control units 9 of other pressure filters 1 which are operated on the basis of the different information of the dewatering process duration.

The device for automatic control of pressure filters operates as follows.

Figure 3:
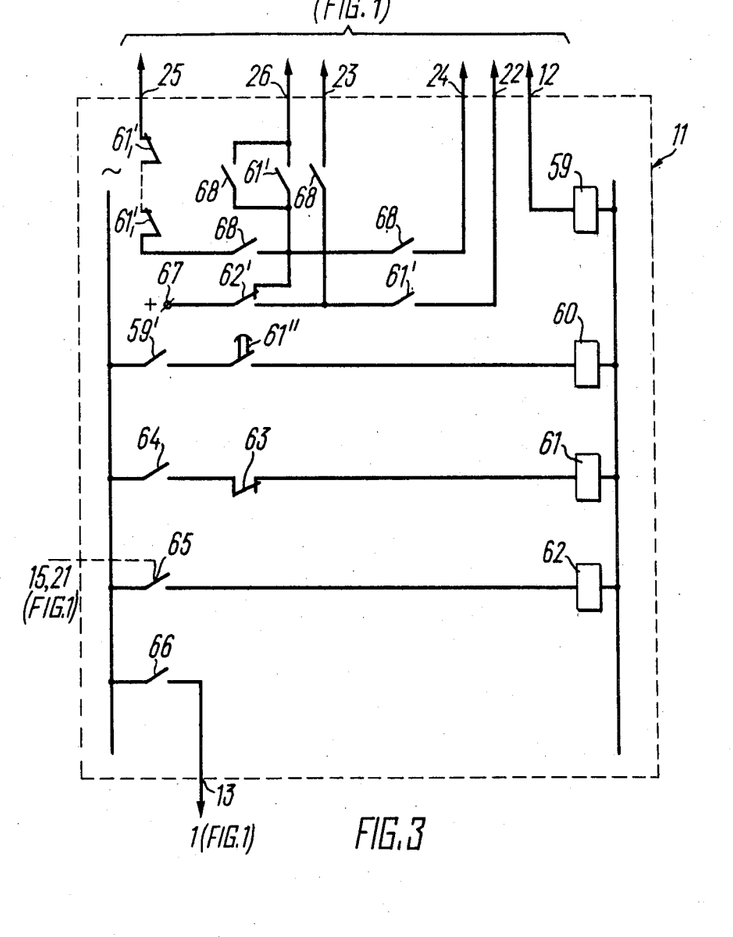
FIG. 3 shows a schematic of a control console, according to the invention.

Prior to the start the operator selects any pressure filter 1 equipped with a sensor 3 as a pilot filter and makes contacts of the switches 15, 21 and 65 (FIG. 3). Power is supplied to all pressure filters 1 (FIG. 1). The contact 63 (FIG. 3) of all pressure filters 1 is disconnected. As the switch 65 is closed, current flows through the coil 62, the relay is actuated and the transfer contact 62' disconnects the control unit 9 (FIG. 1), preparing control circuits of the units 8 and 17 for operation.

The first to be operated is the pilot pressure filter 1. To this end its filtering plates are compressed and fixed. As the plates are fixed, the contact 68 (FIG. 3) is closed and a signal is generated from the terminal 67 to be fed through the control circuit to the unit 8 (FIG. 1) so that the unit 8 is set.

After the filtering plates are fixed, the contacts 68 (FIG. 3) are opened and a command is produced to start the operation of the pilot pressure filter 1 (FIG. 1). To this end the chambers of the pressure filter 1 are filled with the suspension and an excess pressure is built up therein. As soon as the suspension delivery is started, the contact 63 (FIG. 3) of the relay is closed and provides a power supply circuit for the relay coil 61. When the operational excess pressure is reached in the chambers, the contact 64 is closed and the relay coil 61 is energized, the relay is actuated. The contact 61' is closed and a signal is fed from the terminal 67 to the unit 8 (FIG. 1) and to the frequency generator 19 to make them operate. The frequency generator 19 starts producing pulses having a specific frequency, while the unit 8 starts counting the time indicated by the unit 27.

Since the pipe 2 is filled with the filtrate with a certain delay in relation to the moment the operational excess pressure is reached in the chambers of the pilot pressure filter 1, the closing time of the contact 61' (FIG. 3) is selected to be longer than the delay time in order to avoid a false response terminating the dewatering process.

As the pipe 2 and the filtrate pipe 4 are filled, the contact 61" is closed and establishes a power supply circuit for the coil 60.

The information of the sensor 3 (FIG. 1), corresponding to the capacitance value and depending on the degree to which the pipes 2 and 4 are filled with the filtrate, is supplied to the converter 14.

Initially, at the beginning of the suspension dewatering period, the filtrate flows through the pipe 2 in a continuous stream. The capacitance of the sensor 3 is therefore more or less constant, and the recurrence rate of output pulses of the converter 14 is also constant and different from that of the frequency generator 19. No signal is produced at the output of the coincidence circuit 17.

At the moment, when the flow rate of the filtrate passing through the calibrated opening 7' in the baffle 7 exceeds the flow rate of the filtrate coming out of the pressure filter 1, the flow of the filtrate in the pipe 2 is interrupted.

As soon as the filtrate flow in the pipe 2 is interrupted, the capacitance value of the sensor 3 coincides with the value corresponding to the end of the suspension dewatering process and the frequency of the pulses, which corresponds to this value, at the output of the converter 14 coincides with the assigned frequency of pulses produced by the generator 19. These pulses are fed to the unit 17 which produces a signal delivered to the unit 8 and to the control console 11 to the coil 59 (FIG. 3). The timer stops indicating the end of the suspension dewatering period, the contact 59' is closed, and current flows through the relay coil 60 of the actuating devices of the pilot pressure filter 1 thus terminating the supply of suspension to the chambers of this pilot pressure filter 1.

At the same time, a code signal which corresponds to the duration of the suspension dewatering period is fed to the control units 9 (FIG. 1) of other pressure filters 1, particularly to the inputs 29 of the circuits 28. Other pressure filters 1 start operating from this moment on.

The duration of the suspension dewatering period is determined directly on the pilot pressure filter 1, using the timer unit 8, and this information is supplied to the units 9 and control consoles 11. This procedure eliminates the use of tables and participation of operators in the transfer of information from the control console 11 to other control consoles 11 of the rest pressure filters 1.

One of the contacts 61ȷ' (FIG. 3) in the control circuit of the circuits 28 (FIG. 1) coincidence circuits 28 (FIG. 1) of other pressure filters 1 is opened in order to avoid feeding false information to the coincidence circuit 36.

We shall deal with the operation of only one pressure filter 1 since the suspension dewatering process is identical in all of them.

The switch 65 (FIG. 3) of the control console is turned off and all control circuits of the control unit 9 are ready for transmission of a control signal, since the contact 62' is closed.

At the moment the filtering plates are fixed, the contacts 68 in the control circuits of units 9 are closed. DC voltage is supplied from the terminal 67, via the contacts 62' and 68 and via all contacts 61ȷ' to the input 30 (FIG. 1) of the circuit 28 and resets this circuit 28.

DC voltage is supplied from the terminal 67 (FIG. 3) via the contacts 62' and 68 to the input 35 (FIG. 1) of the generator 33 to reset the flip-flop 31 and the circuit 36 and to the input 40 of the divider 38 to reset the divider 38 and interlock the divider 38. A signal "I" s produced at the output of the flip-flop 31 and fed to the input 46 of the AND gate 41.

Direct voltage is supplied from the terminal 67 (FIG. 3), via the contacts 62' and the contact 68 coupled in parallel to the contact 61' to the input 45 (FIG. 1) of the generator 42 and turns it on.

Output signals of the generator 42 are supplied, as pulses, to the input 43 of the AND gate 41. Signals are then supplied from the output of the AND gate 41 to the inputs 47 and 48 of the circuits 28 and 36 respectively.

The signals are added in the circuit 28 and correlated with the information fed from the pressure filter 1. These signals are stored n the circuit 36. When the number of pulses is equal to the number of pulses of the code information, a signal is produced at the output of the circuit 28 and delivered to the input 32 of the flip-flop 31 and resets it. The "0" signal is supplied from the output of the flip-flop 31 to the input 46 of the AND gate 41 to close the gate. Delivery of pulses from the generator 42 is discontinued. The number of pulses in the memory of the circuit 36 corresponds to the code information.

After the filtering plates are completely fixed, the contacts 68 (FIG. 3) are opened and the unit 38 (FIG. 1) is unlocked. The process of dewatering starts in the controlled pressure filter 1.

When the suspension supply starts, the contact 63 (FIG. 3) is closed and prepares the power supply circuit for the relay coil 61. When the operational excess pressure is reached in the chambers, the contact 64 closes and current flows through the relay coil 61 making the relay operate.

Direct voltage is supplied from the terminal 67, via the transfer contact 62' and the contact 61', to the input 45 (FIG. 1) of the generator 42 and from the output thereof pulses are fed to the input 44 (FIG. 1) of the frequency divider 38 which produces pulses at certain intervals to be fed to the input 39 of the coincidence circuit 36. These pulses are summed up in the circuit 36 and compared to a sum of pulses stored therein. If the sums are equal, a signal is produced at the output of the circuit 36 and supplied to the control console 11 to the relay coil 59 (FIG. 3). The contact 59' is closed, current flows through the relay coil 60 belonging to the actuating devices of the pilot pressure filter 1, and the supply of the suspension is terminated.

The converter 14 operates as follows.

There is negative voltage at the output of the converter 14, when it is turned in. This negative voltage is supplied via the resistor 58 (FIG. 2) to the inverting input of the operational amplifier 49 having a negative fedback via the resistor 50 and a positive feedback via the resistor 58. The resistor 54 limits the positive feedback degree. A positive potential is formed at the output of the operational amplifier 49. The output of the operational amplifier 49 is connected to an integrating circuit comprising the resistor 51 and sensor 3 which is a capacitance-type electrical element whose one plate is coupled to a common zero bus. As the positive output voltage of the operational amplifier 49 grows, the sensor 3 is being charged by a positive potential via the resistor 51. The operational amplifier 52 is a voltage follower and the amplified signal produced at the output thereof has a voltage proportional to the voltage across the plates of the capacitance-type element.

Figure 2:
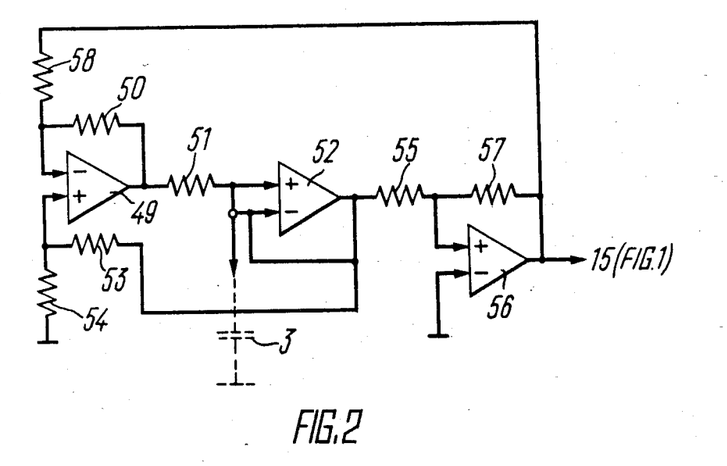
FIG. 2 shows a schematic of a capacitance-to-frequency converter, according to the invention.

The capacitance-type element is charged until a signal is produced at the output of the operational amplifier 52. This signal trips the Schmitt trigger circuit built around the operational amplifier 56. The output signal of the operational amplifier 56 changes cumulatively from negative to positive and is supplied, via the resistor 58, to the control input of the operational amplifier 49, a negative signal being formed at the output thereof. The capacitance-type element starts discharging via the resistor 51, the voltage therein and at the input of the operational amplifier 52 reversing from positive to negative value. At the output of the amplifier 52 the output signal changes the polarity to a negative value, the Schmitt trigger circuit switches over, the polarity of the output signal is reversed from positive to negative value. The process is repeated further on.

When the capacitance of the capacitance-type element is constant, the output signal of the converter 14 has a constant frequency. As the pipe 2 (FIG. 1) and the vertical pipe 4 are filled with the filtrate, the capacitance of the sensor 3 changes, the frequency of the output signal of the converter 14 being the function of this capacitance. When the filtrate flow is interrupted, the capacitance of the sensor 3 reaches the value which corresponds to the frequency of the frequency generator 19.

A device for automatic control of pressure filters provides a constant water content in the discharged cake within specific limits whatever the filtering properties and the content of the solid phase in the suspension; ensures stability of the technological process of suspension filtering by eliminating the discharge of the cake having a water content outside the regulation standards, thus substantially improving the quality of the filtering cake. The downtime of the equipemnt is drastically reduced by elimination of unscheduled clean-ups and failures which are possible when the water content of the cake exceeds the admissible level. The constant water content of the filtering cake permits organization of a stable and reliable technological process for processing the discharged cake and its transportation, cutting down the costs for:

evaporation of water during cake drying;
transportation of the liquid phase to the storage site;
storage due to lesser areas occupied.

A device for automatic control of pressure filters makes the filtering equipment used for dewatering of suspension more efficient, simplifies the dewatering processes and eliminates the effect of the variable filterability of the suspension and the solid phase content therein on the output properties of the suspension -the water content of the cake. It also makes it possible to control a group of pressure filters without an operator.

Industrial Applicability

This invention can be used for dewatering the sediments of sewage at municipal aeration plants, sediments of industrial sewage in papermaking industry, the slime in the circulating water supply systems of gas cleaners, sediments of sewage at neutrilization plants and production installations in microbiological and petrochemical industries.

I claim:

1. A device for automatic control of pressure filters used to dewater suspensions, comprising a control assembly connected to at least one pressure filter (1) and intended for determination of the duration of the suspension dewatering process and provided with a sensor (3) which determines, in the course of dewatering, the moment the solid phase of the suspension reaches assigned parameters, a unit (8) for timing the process of suspension dewatering, which is electrically connected to the sensor (3), control consoles (11) whose number is equal to that of the pressure filters (1), an input (12) of each control console (11) being electrically connected to an output of the timer unit (8), while an output (13) of each control console (11) is connected to an actuating device of each respective pressure filter (1), characterized in that it also comprises a frequency generator (19) whose control input and a first control input of the timer unit (8) are joined together and connected to outputs (22) of the control consoles (11), a second control input of the timer unit (8) is connected to outputs (23) of the control consoles (11), control units (9) whose number is equal to that of the pressure filters (1), a first input of each control unit (9) is connected to the output of the timer unit (8), an output of each control unit (9) is connected to the input (12) of the respective control console (11), the control assembly being connected to at least one pressure filter (1) by means of a filtrate pipe (2), the control assembly being essentially a vertically arranged pipe (4) whose cross-section is equal to or larger than that of the filtrate pipe (2) and which is communicated by the upper end thereof with an initial portion (5) of the filtrate pipe (2), while the lower end thereof is limited by a baffle (7) having a calibrated opening (7') through which the pipe (4) communicates with a final portion (6) of the filtrate pipe (2), the sensor (3) is a capacitance-type element arranged inside the pipe (4) throughout its length so that the axis of the capacitance-type element is displaced in relation to the axis of the calibrated opening (7'), the electrical connection of the sensor (3) with the timer unit (8) is effected via a series-connected elements, namely a capacitance-to-frequency converter (14), a switch (15) for sensor engagement and a frequency coincidence unit (17) connected to an output of the frequency generator (19) and via suspension dewatering termination switches (21) whose number is equal to that of the pressure filters (1) and which are connected to the input (12) of each control console (11), which is joined with an input (20) of the unit (8), outputs (24, 25, 26) of each control console (11) being connected respectively to a second, third and fourth inputs of respective control console (11), the sensor switch (15) and the suspension dewatering termination switch (21) of a respective pressure filter (1) being joined with the switch of the control console (11) of the same pressure filter (1).

2. A device as claimed in claim 1, characterized in that the control unit (9) of each filter (1) comprises a coincidence circuit (28) whose input (29) is connected to an output (10) of the timer unit (8), whose another input (30) is conneted to the output (25) of the control console (11), a flip-flop (31) whose input (32) is connected to an output of the coincidence circuit (28), an electrical signal generator (33) whose output is connected to an input (34) of the flip-flop (31), while the input (35) thereof is connected to the output (24) of the control console (11), a coincidence circuit (36) whose input (37) is connected to an output of the electrical signal generator (33), while the output thereof is connected to the input (12) of the control console (11), a frequency divider (38) whose output is connected to an input (39) of the coincidence circuit (36) and an input (40) is joined with the input (35) of the electrical signal generator (33), an AND gate (41), a pulse generator (42) whose output is connected to an input (43) of the AND gate (41) and to an input (44) of the frequency divider (38) and an input (45) is connected to the output (26) of the control console (II), an input (46) of the AND gate (41) being connected to an output of the flip-flop (31) while the output thereof is connected to inputs (47, 48) of the circuits (28, 36) respectively.

* * * * *